_United States Patent Office_

3,553,214
Patented Jan. 5, 1971

3,553,214
1,4-DIHYDRO-3H-2,3-BENZOXAZINE DERIVATIVES
David G. Martin, Kalamazoo, Mich., assignor to The Upjohn Company, Kalamazoo, Mich., a corporation of Delaware
No Drawing. Continuation-in-part of application Ser. No. 686,733, Nov. 29, 1967. This application June 5, 1968, Ser. No. 734,547
Int. Cl. C07d 87/12
U.S. Cl. 260—244                    2 Claims

ABSTRACT OF THE DISCLOSURE

1,4-dihydro-3H-2,3-benzoxazine is reacted with halophenyl chloroformate to form halophenyl esters of 1,4-dihydro-3H-2,3-benzoxazine-3-carboxylic acid. The 1,4-dihydro-3H-2,3-benzoxazine-3-carboxylic acid halophenyl esters have utility as antifungal and antilipemic agents.

CROSS REFERENCE TO RELATED APPLICATION

This is a continuation-in-part of pending application Ser. No. 686,733, filed Nov. 29, 1967.

BRIEF SUMMARY OF THE INVENTION

This invention relates to novel compounds and processes for preparing the same. More particularly this invention relates to 1,4-dihydro-3H-2,3-benzoxazine derivatives having the formula:

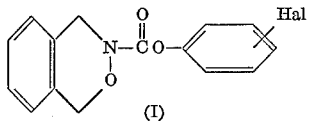

(I)

wherein Hal represents a member selected from the group consisting of chloro, bromo, iodo, and fluoro.

The novel compounds are prepared by reacting 1,4-dihydro-3H-2,3-benzoxazine with a halophenyl chloroformate in the presence of an inert solvent, e.g., ether, benzene, toluene, or the like, and an acid acceptor, e.g., triethylamine, pyridine, quinoline, or the like.

DETAILED DESCRIPTION

The novel compounds of this invention are prepared by reacting a compound having the formula:

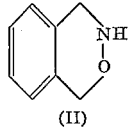

(II)

with a halophenyl chloroformate. The process is illustrated by the following equation:

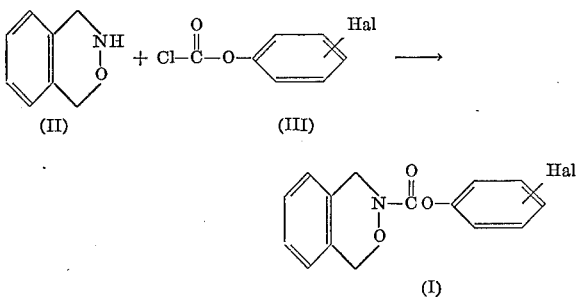

wherein Hal is a member selected from the group consisting of chloro, bromo, iodo, and fluoro.

The reaction readily takes place at 25° C. However, higher or lower temperatures, for example 0 to 100° C. can be utilized if desired.

The starting compound, Formula II, is prepared by basifying the corresponding hydrochloride. The hydrochloride can be prepared by reacting ortho-(bis-chloromethyl)benzene with either an alkyl hydroxycarbamate or benzohydroxamic acid and a base, and reacting the product with a solution of an alcohol such as methanol, ethanol, propanol, isopropanol and the like, and hydrogen chloride. The process for making the starting compound is illustrated in the following equations:

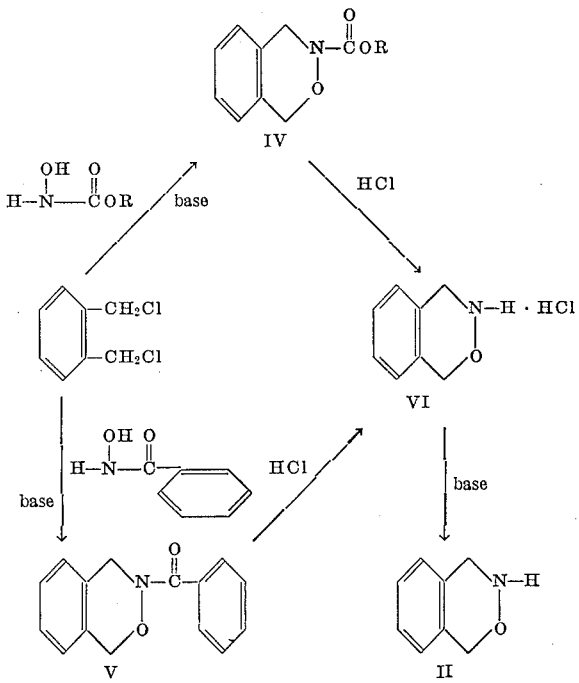

wherein R is alkyl containing from 1 to 4 carbon atoms, inclusive.

The starting halophenyl chloroformate (III) is prepared by reacting a halophenol with phosgene in the presence of a base and a solvent. The procedure under which this reaction is carried out is well known to those skilled in the art and the halophenols used therein are either readily available from commercial sources or they may be prepared by well known procedures.

The compounds of the present invention find valuable application as antilipemic and antifungal agents. Illustratively, when 1,4-dihydro-3H-2,3-benzoxazine-3-carboxylic acid p-chlorophenyl ester is incorporated in agar, it has an inhibitory effect on _Blastomyces dermatitidis_ and _Hormodendrum compactum_.

The novel compounds of this invention also exhibit antilipemic activity in animals. For example, they lower serum cholesterol and triglycerides.

For purposes of administration to mammals, including animals of economic value, such as horses, cattle, sheep, pigs, mice, rats, rabbits, and the like, the novel compounds of this invention can be combined with solid or liquid pharmaceutical carriers and formulated in the form of tablets, powder packets, capsules, and like solid dosage forms, using starch and like excipients, or dissolved or suspended in suitable solvents or vehicles, for oral or parenteral administration.

The following examples are set forth to illustrate the products and processes of the present invention and are not intended to limit the scope thereof.

Example 1.—1,4-dihydro-3H-2,3-benzoxazine (A) 1,4-dihydro-3H-2,3-benzoxazine-3-carboxylic acid ethyl ester.—Sodium hydride (55 g. of 55% sodium hydride mineral oil dispersion; 1.25 moles) was cautiously dissolved in 1 l. of absolute ethanol with stirring and cooling under an atmosphere of nitrogen. Ethyl hydroxycarbamate (64.2 g.; 0.61 mole) was added to the cold sodium ethoxide solution. The resulting solution was kept in the ice-bath while 100-ml. portions were added slowly through a dropping funnel to a stirred, refluxing solution of 108.2 g. (0.62 mole) of ortho-(bis-chloromethyl)-benzene in 1 l. of ethanol. The addition required about 2 hrs., after which the reaction mixture was refluxed for an additional 1.75 hrs. After stirring overnight at 25° C., salts were removed by filtration and washed with ethanol. The filtrate was evaporated to dryness under reduced pressure, and the residue taken up in ether, washed with water, 5% potassium hydroxide water, 5% hydrochloric acid, and water, dried over magnesium sulfate, and evaporated to dryness under reduced pressure. The residue consisted of two layers; the upper layer was essentially pure mineral oil and was siphoned off. The lower layer was distilled at approximately 0.5 mm. mercury pressure. Initially a fraction (15.52 g.) distilling at 65–85° C. was collected and discarded. This was followed by a fraction (3.21 g.) distilling at 85–110° C. which was a mixture of non-nitrogenous material and 1,4-dihydro-3H-2,3-benzoxazine-3-carboxylic acid ethyl ester. This in turn was followed by 1,4-dihydro-3H-2,3-benzoxazine-3-carboxylic acid ethyl ester (52.35 g.) distilling at 112–119° C. Spectra (IR, UV, NMR) were consistent with the structure.

*Analysis.*—Calc'd for $C_{11}H_{13}NO_3$ (percent): C, 63.75; H, 6.32; N, 6.76. Found (percent): C, 63.70; H, 6.33; N, 6.54.

The 1,4-dihydro-3H-2,3-benzoxazine-3-carboxylic acid methyl, propyl and butyl esters were prepared in the same manner by substituting the methyl, propyl and butyl hydroxycarbamates, respectively, for the ethyl hydroxycarbamate and the corresponding alcohols for ethanol in the above procedure.

(B) 1,4-dihydro-3H-2,3-benzoxazine hydrochloride.— A solution of 47.25 g. (0.228 mole) of 1,4-dihydro-3H-2,3-benzoxazine-3-carboxylic acid ethyl ester in 480 ml. methanol, 190 ml. water and 190 ml. concentrated hydrochloric acid was refluxed for 19 hrs. and evaporated to dryness under reduced pressure. The crystalline residue was washed thoroughly with ether, affording 33.1 g. (85%), M.P. 181–184° C., of 1,4-dihydro-3H-2,3-benzoxazine hydrochloride.

(C) 1,4-dihydro-3H-2,3-benzoxazine.—An aqueous solution of 5.0 g. of 1,4-dihydro-3H-2,3-benzoxazine hydrochloride was basified with sodium hydroxide, diluted with saturated sodium chloride solution and extracted with ether to yield an ethereal solution of 1,4-dihydro-3H-2,3-benzoxazine. This compound was isolated by evaporating the ethereal solution to dryness.

Example 2.—1,4-dihydro-3H-2,3-benzoxazine hydrochloride (A) 3-benzoyl-1,4-dihydro-3H-2,3-benzoxazine.—To a stirred solution of sodium isopropoxide (9.0 g. of 56% sodium hydride in mineral oil in 1.0 l. of isopropanol; 0.21 mole) was added a solution of 13.7 g. (0.1 mole) of benzohydroxamic acid in 300 ml. of isopropanol and 17.5 g. (0.1 mole) of ortho-(bis-chloromethyl)benzene in 200 ml. of isopropanol. The reaction mixture was stirred and refluxed for 19 hrs. and then filtered hot through infusorial earth. The filtrate was evaporated to dryness under reduced pressure and the residue was taken up in methylene chloride, washed with water, dried over sodium sulfate, and concentrated on a steam bath. The methylene chloride was completely displaced with cyclohexane and the hot mixture was filtered through infusorial earth. The filtrate was evaporated to dryness, leaving 26 g. of residue which was chromatographed on a column of silica gel (3 l.) with 20% acetone in cyclohexane. Fractions of 75 ml. were collected. Essentially homogeneous 3-benzoyl-1,4-dihydro-3H-2,3-benzoxazine was found in fractions 48 through 51. Successive recrystallization of this material from a mixture of methylene chloride and Skellysolve B hexanes, and aqueous methanol, yielded the purified compound, melting at 85–85.5 C. The structure was supported by NMR, IR and UV spectral data.

*Analysis.*—Calc'd for $C_{15}H_{13}NO_2$ (percent): C, 75.30; H, 5.48; N, 5.85. Found (percent): C, 75.23; H, 5.79; N, 5.86.

(B) 1,4-dihydro-3H-2,3-benzoxazine hydrochloride.— 3-benzoyl-1,4-dihydro-3H-2,3-benzoxazine (2.54 g.) was dissolved in isopropanol (100 ml.) and treated with 25 ml. of 6 N hydrogen chloride in isopropanol. The solution was refluxed for 2¼ hrs. and then the solvent was evaporated under reduced pressure. The residue was triturated and washed thoroughly with ether, affording 1.50 g. of 1,4-dihydro-3H-2,3-benzoxazine hydrochloride, M.P. 171–174° C. Recrystallization from a mixture of methanol and ethyl acetate afforded 1.45 g. (80%) of analytically pure product, M.P. 180.5–182.5° C. Spectral data (NMR, IR, UV) supported the structural assignment.

*Analysis.*—Calc'd for $C_8H_9NO \cdot HCl$ (percent): C, 55.98; H, 5.87; N, 8.16; Cl. 20.66. Found (percent): C, 56.17; H, 6.26; N, 8.44; Cl, 20.57.

Example 3.—1,4-dihydro-3H-2,3-benzoxazine-3-carboxylic acid p-chlorophenyl ester (A) p-chlorophenyl chloroformate.—p-Chlorophenyl chloroformate was prepared by adding dropwise a solution of 62.12 g. of p-chlorophenol in 121 ml. 4 N sodium hydroxide to a chilled stirred solution of 40 ml. of liquid phosgene in 200 ml. of methylene chloride. The resulting two-layer mixture was then stirred for 2 hours at 25° C., and the layers were separated. The methylene chloride layer was washed with two portions of 1 N sodium hydroxide, dried over sodium sulfate, and evaporated under reduced pressure, leaving a solid residue which consisted of about 85 p-chlorophenyl chloroformate and 15% p-chlorophenyl carbonate.

(B) 1,4-dihydro-3H-2,3-benzoxazine-3-carboxylic acid p-chlorophenyl ester.—The p-chlorophenyl chloroformate (3.45 g.), prepared in step (A), was dissolved in ether and treated with 3.0 ml. of triethylamine and an ethereal solution of 1,4-dihydro-3H-2,3-benzoxazine prepared from 3 g. of the hydrochloride. The mixture was stirred at 25° C. for 3¼ hrs. and washed with dilute hydrochloride acid, then with water. After drying over magnesium sulfate, the ether was evaporated, leaving a crystalline residue. Recrystallization from methanol afforded a solid mixture containing predominantly 1,4-dihydro-3H-2,3-benzoxazine-3-carboxylic acid p-chlorophenyl ester. This crude product was chromatographed on 800 ml. of silica gel with 15% acetone in cyclohexane, collecting 60 ml. fractions. Fractions 15 through 19 consisted of 1,4-dihydro-3H-2,3-benzoxazine-3-carboxylic acid p-chlorophenyl ester (2.97 g. melting between 94.5 and 97.5° C.). Two recrystallizations from methanol afforded an analytical sample, M.P. 95.5–97.5° C.

*Analysis.*—Calc'd for $C_{15}H_{12}ClNO_3$ (percent): C, 62.18; H, 4.18; Cl. 12.24; N, 4.84. Found (percent): C, 62.38; H, 3.96; Cl, 12.32; N, 4.88.

Using the same procedure as described in Example 3, Part B, but replacing p-chlorophenyl chloroformate by o-chlorophenyl chloroformate and m-chlorophenyl chloroformate, there are obtained 1,4-dihydro-3H-2,3-benzoxazine-3-carboxylic acid o-chlorophenyl ester and 1,4-dihydro-3H-2,3-benzoxazine-3-carboxylic acid m-chlorophenyl ester, respectively.

Similarly, using the procedure as described in Example 3, Part B, but replacing p-chlorophenyl chloroformate by the appropriate halophenyl chloroformate, there are obtained the corresponding 1,4-dihydro-3H-2,3-benzoxazine-3-carboxylic acid halophenyl esters. Representative of the halophenyl esters so obtained are 1,4-dihydro-3H-2,3-benzoxazine-3-carboxylic acid p-bromophenyl ester;
1,4-dihydro-3H-2,3-benzoxazine-3-carboxylic acid o-bromophenyl ester;
1,4-dihydro-3H-2,3-benzoxazine-3-carboxylic acid m-bromophenyl ester;
1,4-dihydro-3H-2,3-benzoxazine-3-carboxylic acid p-iodophenyl ester;
1,4-dihydro-3H-2,3-benzoxazine-3-carboxylic acid m-iodophenyl ester;
1,4-dihydro-3H-2,3-benzoxazine-3-carboxylic acid o-iodophenyl ester;
1,4-dihydro-3H-2,3-benzoxazine-3-carboxylic acid p-fluorophenyl ester;
1,4-dihydro-3H-2,3-benzoxazine-3-carboxylic acid m-fluorophenyl ester; and
1,4-dihydro-3H-2,3-benzoxazine-3-carboxylic acid o-fluorophenyl ester.

I claim:
1. A compound having the formula:

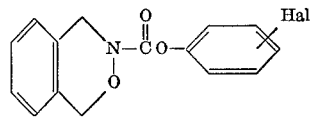

wherein Hal is a member selected from the group consisting of chloro, bromo, iodo, and fluoro.

2. A compound of claim 1 wherein Hal is para-chloro.

References Cited

UNITED STATES PATENTS 3,019,255  1/1962  Murfitt _____ 260—482C
3,226,426  12/1965  Hopkins et al. _____ 260—482C

OTHER REFERENCES

Adams et al.: Chem. Rev. vol. 65, page 570 (1965).
Pifferi et al.: Gazzetta Chimica Italiana, vol. 96, pages 1671–4 and 1681, relied on (December 1966).

NATALIE TROUSOF, Primary Examiner

U.S. Cl. X.R.

260—463, 799